June 14, 1960 T. H. HEATH 2,940,292
COMPARTMENT LOCKING SYSTEM
Filed Nov. 9, 1956
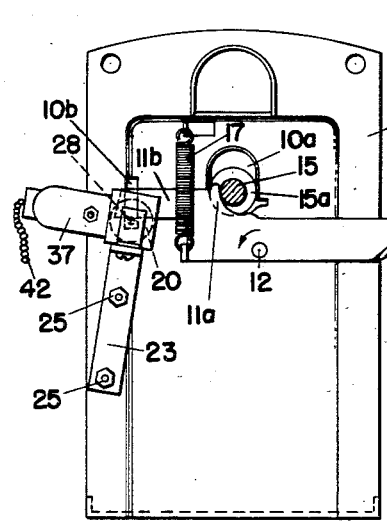
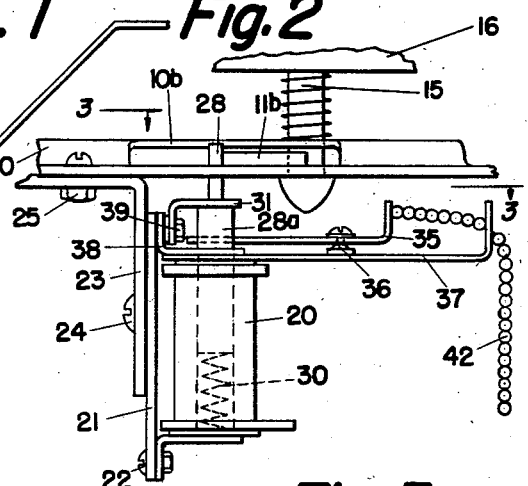
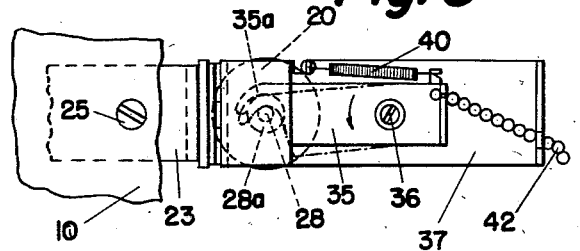
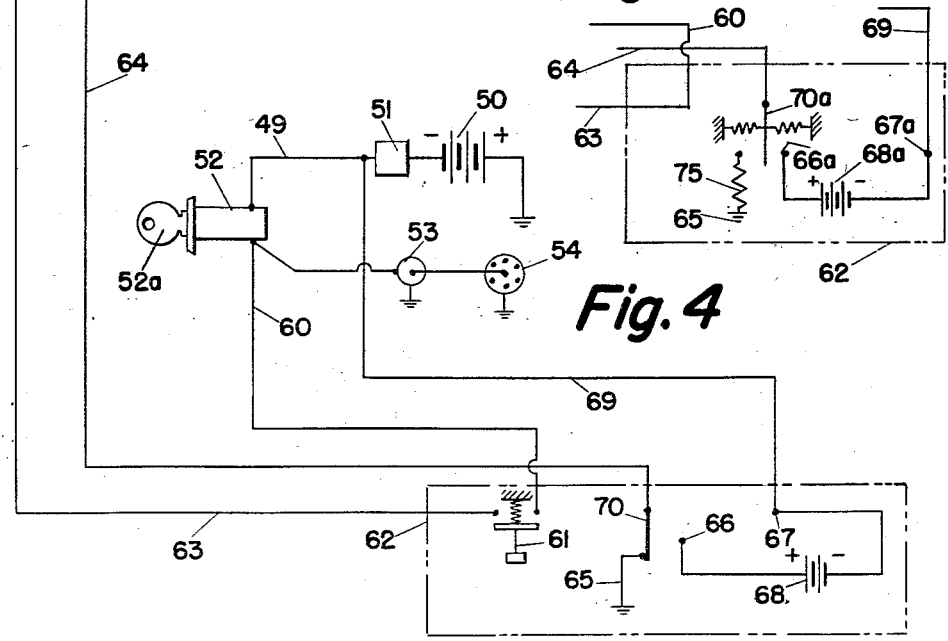

United States Patent Office 2,940,292
Patented June 14, 1960

2,940,292

COMPARTMENT LOCKING SYSTEM

Theodore H. Heath, Philadelphia, Pa., assignor of fifty-one percent to Joseph Pentony, Ardmore, Pa.

Filed Nov. 9, 1956, Ser. No. 621,425

1 Claim. (Cl. 70—241)

This invention relates to a compartment locking system and has for an object the provision of a locking system particularly suited for preventing unauthorized access to the interior of a compartment such, for example, as a movable closure member or the hood for the engine of a power operated vehicle.

Since about 1953 the engine hoods of automobiles and trucks have been freely accessible to any one even though the doors and windows of the vehicle were locked by the owner. The reason for this is the fact that the latching devices which have been provided for the hoods are manually operable entirely from the exterior of the vehicle. All that has been necessary to obtain access to the engine has been to reach one's hand through the grill work at the front of the automobile and beneath the hood so as to grasp the latching arm and move it out of engagement with a cooperating member on the hood which held the latter in place. Prior to 1953 many models of automobiles were provided with a manual release for the hood latch which was operable from the interior of the vehicle and thus provided some measure of protection for the engine compartment so long as the doors and windows were locked. However, in 1953 this feature was removed from the vehicles and since that time access to the engine and other equipment beneath the hood, such as batteries and the like, has been freely accessible to any one whether the vehicle be locked or not.

It is an object of the present invention to provide a control system whereby access to the interior of the engine hood is prevented without using the ignition key to unlock and close the ignition switch. It is a further object of the invention to provide a control system for locking the hood for the engine compartment in closed position and which may be unlocked by energy derived from the power supply of the vehicle contained in the engine compartment or from an external auxiliary power supply. This feature is particularly advantageous as it requires that the ignition key be turned to the on position, thus preventing unauthorized opening of the hood without the ignition key, and additionally it prevents any possibility of the hood being locked in closed position preventing entry to the engine compartment in the event the power supply of the vehicle fails.

More particularly and in accordance with one aspect of the invention, there is provided the combination with a power operated vehicle having a closure member movable for access to the interior of a compartment thereof which houses a first power supply and latching means manually operable for releasing the closure member, of a control system having control means for preventing operation of the latching means to prevent access to the compartment and a control circuit therefor. The control circuit comprises a first circuit controlling means in series circuit between the power supply and the control means for partially completing the energizing circuit therebetween. The control circuit further includes terminal means accessible from the outside of the closure member for an auxiliary power supply and a circuit connection from the terminal means to the series circuit between the first power supply and the first circuit controlling means. There is further provided additional circuit controlling means selectively operable for finally completing the circuit between the control means and one of the power supplies.

In a further aspect of the invention the control means for preventing operation of the latching means comprises a solenoid which is spring biased to a normally extended position and adapted to be retracted when energy is applied to the coil from a power supply. The solenoid is adapted for mounting adjacent the latching mechanism of the hood so that the solenoid plunger when in extended or non-energized position extends through the plane or path of movement of the hood latching member. When the control circuit for the control means is energized, the plunger is withdrawn from its aforesaid position and is automatically latched in the latter position so as to permit free manual operation of the hood latching mechanism. After the hood is closed and it is again desired to lock the hood against unauthorized entry a mechanical latch on the control means is adapted to be pulled thereby releasing the plunger for movement again into the plane of movement of the hood latching mechanism.

For a more detailed disclosure of the invention and for further objects and advantages thereof, reference is to be had to the following description taken in conjunction with the accompanying drawings, in which:

Fig. 1 is a fractional bottom plan view of one type of automobile hood latching apparatus and showing an embodiment of the novel control means for locking the hood latch to prevent operation thereof;

Fig. 2 is a fractional side elevation view of the device shown in Fig. 1;

Fig. 3 is a fractional top plan view taken along the lines 3—3 in Fig. 2;

Fig. 4 is a diagrammatic view of the novel control system as applied to a motor vehicle, and Fig. 5 is a fractional view showing a modification of the system shown in Fig. 4.

Referring to Fig. 1 there is shown a latch plate 10 and a spring biased lever arm 11 pivoted at 12 to latch plate 10. The latch plate 10 is adapted to be mounted within the compartment of a motor vehicle for housing the engine and at the end of the compartment opposite the hinged end of the movable closure member or hood 16. The latch plate 10 is provided with an opening 10a through which is adapted to extend a post 15 projecting from the bottom of the movable closure member or hood 16 of the automobile. The post 15 has a circumferential groove or reduced neck portion 15a which is adapted to receive a locking element 11a on arm 11. When the hood 16 is in closed position as indicated in Figs. 1 and 2, the spring 17 holds the locking element 11a of arm 11 within the groove 15a on the post 15. This prevents the hood 16 from being raised accidentally. To release the latching mechanism so that the hood may be raised for access to the engine or other parts disposed beneath the hood an operator may reach through the grill work at the front of the automobile to grasp the handle or arm 11 and rotate it in a counter-clockwise direction, Fig. 1, around pivot 12 and against the bias of spring 17. This removes the latching element 11a from groove 15a and permits the hood 16 to be raised or opened. The foregoing is typical of the hood latching mechanism on a majority of automobiles and trucks manufactured since 1953.

It is to be noted that the latching mechanism as described thus far is operable entirely from outside of the vehicle. Thus it has been impossible for vehicle owners with latching mechanisms of the foregoing type to prevent unauthorized access to the engines of their vehicles regardless of whether they locked the doors and windows of their vehicles or not.

In accordance with the present invention provision is made so that unauthorized access to the interior of the automobile hood can be eliminated and operation of the manual latching mechanism is prevented without unlocking and closing the ignition switch. As may be seen in Figs. 1–3 there is provided a control means in the form of a solenoid 20 mounted on a plate 21 as by screws 22 which in turn is mounted on an angle bracket 23 and secured thereto by suitable means such as a screw 24. The bracket 23 is in turn adapted to be mounted beneath the latch plate 10 of the latching mechanism as shown in Fig. 2. The bracket 23 may be provided with a plurality of holes extending through it so as to permit the solenoid 20 to be mounted in various positions depending upon the specific construction of the manual latching mechanism provided on the motor vehicle. The essential requirement is that the solenoid 20 be mounted in a position which permits the end of the plunger 28 to extend into the path of movement of a portion of the latching arm 11 so as to prevent operation thereof when desired.

As may be seen in Figs. 1 and 2, the plunger 28 is adapted to extend through an opening 10b in latch plate 10 into the plane of the extension 11b on operating arm 11. This permits the control device 20 to be attached to existing automotive equipment with minimum modification as all that is necessary is to drill the holes in the latch plate 10 to receive the bolts 25 which connect bracket 23 to latch plate 10. It is to be understood that the portion 11b and the latch plate 10 may be drilled so as to permit the solenoid 20 to be mounted for passage of the end of plunger 28 through both the member 11b and the latch plate 10. The arrangement as illustrated is preferred as it requires the minimum amount of work in installation and at the same time provides an effective locking arrangement.

The solenoid spring 30, Fig. 2, normally biases the plunger 28 to its outermost position as illustrated. This position is limited by the stop member 31 which is adapted to engage the enlarged portion 28a of plunger 28 and has an opening therein which permits the end portion of reduced diameter to pass therethrough and into the path of movement of the latching arm 11b. When the coil of the solenoid 20 is energized the plunger 28 is retracted compressing the spring 30 and moving the enlarged portion 28a of the plunger to a position beneath the lever arm 35. The lever arm 35 is pivotally mounted at 36 on a support 37 which in turn is mounted for pivotal movement about the axis of plunger 28. The support 37 has an opening at its left-hand end as shown in Fig. 2 through which the plunger 28 extends and the support 37 is held in position between an end of the solenoid 20 and a bracket 38 mounted on plate 21 by the same screws 39 which hold stop member 31 in position. The arm 35 serves as a mechanical latch for the plunger 28 and is biased by a spring 40, Fig. 3, for counter-clockwise rotation about pivot 36. Thus when the plunger 28 is retracted as by energization of the solenoid coil the hooked end 35a of arm 35 moves from its full line position to the phantom line position, Fig. 3, against the reduced diameter portion of plunger 28 and in front of the shoulder formed by portion 28a thus preventing the solenoid spring 30 from forcing the solenoid to its outermost position shown in Fig. 2.

In order that the control means may be manually reset after the solenoid 20 has been energized, there is provided a chain member 42 which is connected to the end of lever 35 and when it is pulled it will pivot the lever 35 in a clockwise direction about pivot 36 as shown in Fig. 3 thereby permitting the plunger 28 to move to the extended position shown in Fig. 2 for preventing operation of the latching arm 11. The support 37 by being pivotally mounted about the axis of the plunger 28 permits the chain 42 and the latching lever 35 as well as the support 37 to be moved to any angular position so that it will not be in the way when the engine is being worked on. The chain 42 is adapted to extend close to the front end of the hood so that it may be pulled to reset the control means after the work has been completed inside the hood and it is again desired to lock the hood against unauthorized entry. By providing a latch 35 for the solenoid 20 the plunger 28 can be held in retracted position and the hood 16 may be opened or closed as many times as desired, for example, when the automobile is in the garage for repairs, without the need of further energization of the solenoid coil. It is only when the latch 35 releases the plunger 28 that it is again necessary to energize the solenoid before the latching arm 11 can be operated to again open the hood 16.

Having described the control means for the novel control system the complete control system will now be described in connection with the operation of the control means. Referring to Fig. 4 there is illustrated diagrammatically an ignition system for an automobile. This system includes a battery 50 which normally will be of either the 6 or 12 volt type. One side of the battery is connected to ground, i.e. the frame of the automobile. To the other side of the battery is connected a starter relay 51 and a starter-ignition switch 52. In circuit with these are an ignition coil 53 and a distributor 54. This is the conventional ignition system for motor vehicles.

In addition to the foregoing ignition system, it will be seen in Fig. 4 that a conductor 60 is connected to one side of the circuit controlling switch 52 and the opposite end of conductor 60 is connected to a second circuit controlling switch 61. The switch 61 is of the intermittently closed type such, for example, as a push button switch and is disposed at a location on the automobile which is readily accessible from the driver's seat. For example, the push button switch 61 has been illustrated as being mounted within a glove compartment 62 which is normally provided with a lock for its door. The other side of switch 61 is connected by way of a conductor 63 to the coil in solenoid 20. The solenoid 20 is also connected by way of a conductor 64 to a ground connection 65 for completing the control circuit.

It will be assumed in describing the operation of the control circuit that the automobile hood is in closed position and the plunger 28 of the solenoid 20 has been released and is held in extended position by the spring 30 thus blocking the movement of lever arm 11 and preventing the latching mechanism for the hood from being opened. In order to release the latching mechanism from this locked position, it is first necessary to insert the ignition key 52a in the ignition switch 52 and turn it to closed position so as to partially complete a circuit between the battery 50 and the coil of the solenoid 20. While this operation permits the engine to be started, it is to be noted that the energization circuit for the solenoid 20 is not completed until the push button 61 is depressed to connect conductors 60 and 63 at which time the coil of the solenoid will be energized to withdraw the plunger 28 from its position in the path of movement of the lever arm 11. As the solenoid latching arm 35 will hold the plunger 28 in retracted position, it is necessary to hold the push button 61 closed only momentarily. When this operation has been completed the latching mechanism for the hood may be operated manually without further interference by the solenoid. The push button device 61 may include a thermal cut-out or other protective device for preventing the solenoid coil from being overloaded in the event the push button is held in closed position.

As the battery or power supply 50 for the solenoid 20 is located within the compartment enclosed by the hood 16, provision has been made in accordance with the present invention for eliminating the possibility of having the hood permanently locked should the battery 50 become discharged or otherwise fail. It will be seen in Fig. 4 that the ground connection 65 is located in the glove compartment 62 along with a pair of power terminals 66 and 67. The power terminals 66 and 67 are readily accessible without getting under the hood 16 and are adapted for connection to an auxiliary power supply such as the battery 68. The terminal 67 is connected by way of a conductor 69 to the series circuit 49 between the battery 50 and the switch 52. For convenience in transferring from the main battery 50 to the auxiliary battery 68 when the former is no longer operative to energize the coil of relay 20, there is provided a circuit controlling means in the form of a switch 70 which is selectively operable to transfer the conductor 64 from its connection to the ground conductor 65 to the power terminal 66.

The switch 70 may be of any two position type such as a toggle switch, knife switch or push button switch. If it is of the push button type, the movable contact is biased into a normally closed position with respect to the ground conductor 65. This insures that when the main battery 50 is functioning properly the energy for the relay 20 will be derived from this battery merely by momentarily closing the switch 61. When battery 50 fails the solenoid 20 will be operated by pushing the push button of switch 61 and operating the switch 70, the latter completing the circuit between conductor 64 and terminal 66 and thus placing the auxiliary power supply 68 in circuit with the coil of solenoid 20. The auxiliary power circuit for the solenoid 20 may be traced from one side of battery 68 through terminal 67, conductor 69 through switch 52 and conductor 60 to one side of push button switch 61. When switch 61 is closed the circuit is completed through conductor 63 through the solenoid 20 and conductor 64 through switch 70 to the other terminal 66 when the switch 70 has been operated. It will be noted that the conductor 69 is connected to 49 at a point between the switch 52 and the starter relay 51. Thus the auxiliary power supply 68 is employed only to energize the coil of solenoid 20. The auxiliary power supply may be derived from a dry cell battery carried in the glove compartment or it may be derived from the battery of another motor vehicle by way of "clip-on" leads connected to the terminals 66 and 67 and to the battery of a passing motorist.

Referring to Fig. 5, there is shown a modification of the control circuit previously described in connection with Fig. 4. In Fig. 5 the push button 61 has been eliminated and the conductor 63 from one side of the solenoid 20 is connected directly to conductor 60 going to one side of the switch 52. The ground connection 65 in the glove compartment 62 is connected to one contact of a three position switch 70a which is biased to a central normally open position. To operate the circuit shown in Fig. 5 the ignition switch 52 is first closed partially completing the circuit to the solenoid 20 and the circuit is finally completed by moving the movable contact of switch 70a into engagement with the terminal of the ground connection 65 to complete the circuit through the main battery 50. Should the main battery 50 not be functioning, the solenoid 20 may be operated to release the latching mechanism for the hood and thus prevent it from being permanently locked by moving the switch 70a into engagement with contact 66a of the auxiliary power supply 68a. The other terminal 67a for the auxiliary power supply is connected by way of conductor 69 to conductor 49 in the same manner as shown in Fig. 4.

The coil of solenoid 20 may be wound so as to operate on a voltage lower than the normal voltage of the storage battery 50. Thus the auxiliary battery 68a may have a similar low voltage and will provide adequate power for energizing the solenoid 20 to withdraw the plunger 28 and unlock the hood latching mechanism. In order to avoid overloading the coil of solenoid 20 when it is operated from the main battery supply 50, a thermal protective device or a voltage dropping resistor 75 may be included in the ground circuit 65. Such resistor ordinarily would not be necessary with 6 volt battery systems but can be used in systems which provide a source of 12 volts or higher. It is, of course, understood resistor 75 may also be used in the circuit of Fig. 4.

From the foregoing it will be seen that the present invention provides a system for preventing unauthorized access to the engine compartment of motor vehicles by requiring that the ignition switch must be turned on before the mechanical latch for the hood can be released. It further insures that the hood will not be locked in closed position when the main battery supply fails as there is provided an auxiliary power circuit for releasing the solenoid to unlock the latching mechanism. However, whether the power for the solenoid be derived from the main battery of the automobile or from the auxiliary power supply, the automobile hood cannot be opened without first turning the ignition key to close the ignition switch for completion of the control circuit.

The present invention represents a substantial advance in the prevention of motor vehicle thefts by providing an attachment control system adapted for convenient installation on any existing hood latch mechanisms. This invention enables advantage to be taken of the existing locks on the vehicle door, the ignition switch and the glove compartment to provide a triple lock for the normally unlocked manually operated latching mechanism on the engine hoods of motor vehicles.

While the invention has been described principally in connection with automobiles, it is to be understood that it is applicable to other types of vehicles wherein the power supply for the vehicle is contained within a compartment which is to be locked to avoid unauthorized entry thereto.

While there have been described preferred embodiments of the invention, it is to be understood that further modifications thereof may be made within the scope of the appended claims. For example, in Fig. 5 the push button switch 61 can be employed in the same manner as in Fig. 4 to connect conductors 60 and 63. Also, in Fig. 4 conductor 64 can be connected directly to terminal 66 and the ground connection 65 and the lead to one side of battery 68 made movable for selective connection to terminal 66.

What is claimed is:

In a motor vehicle having a movable hood for access to the battery within the engine compartment and latching means manually operable from the exterior of the vehicle for releasing the hood, an attachment comprising a solenoid including a coil and a plunger, said plunger being spring-biased to a normally extended position and adapted to be retracted when electrical energy is applied to said coil from a power supply, said solenoid being mounted adjacent the latching member so that said plunger when in extended position extends into the normal path of movement of the hood latching member to lock the hood in closed position, circuit connections extending from within the vehicle to said solenoid within the engine compartment for operation of said plunger from the battery of the vehicle to unlock the latching member and permit manual operation thereof for opening the hood, means for automatically holding said plunger in a retracted position out of the path of movement of the latching member after deenergizing said coil, mechanical means selectively operable from the exterior of the motor vehicle independently of the position of the hood for releasing said plunger from said holding means for movement again into the path of movement of the latching member for locking the hood after it is closed, auxiliary power terminals disposed within the vehicle outside of the engine compartment, and circuit means connecting said auxiliary power terminals with said solenoid in the engine compartment for applying auxiliary power to said solenoid to prevent the hood from being permanently locked in closed position when the battery is inoperative.

References Cited in the file of this patent

UNITED STATES PATENTS

| | | |
|---|---|---|
| 1,199,199 | Mason | Sept. 26, 1916 |
| 1,768,021 | Bauerband | June 24, 1930 |
| 1,807,033 | Hansen | May 26, 1931 |
| 1,833,572 | Hardesty | Nov. 24, 1931 |
| 2,079,824 | Smeaton et al. | May 11, 1937 |
| 2,206,137 | Tedtman | July 2, 1940 |
| 2,809,064 | Dlugatch | Oct. 8, 1957 |